United States Patent [19]
Sadow

[11] Patent Number: 5,755,329
[45] Date of Patent: *May 26, 1998

[54] HIGH PRESSURE AIR CUSHION FOR ELECTRONIC EQUIPMENT

[75] Inventor: Bernard David Sadow, Chappaqua, N.Y.

[73] Assignee: Outrigger, Inc., Chappaqua, N.Y.

[*] Notice: The term of this patent shall not extend beyond the expiration date of Pat. No. 5,622,262.

[21] Appl. No.: 756,072

[22] Filed: Nov. 25, 1996

Related U.S. Application Data

[63] Continuation-in-part of Ser. No. 383,292, Feb. 2, 1995, Pat. No. 5,622,262, which is a continuation-in-part of Ser. No. 360,013, Dec. 20, 1994, abandoned, which is a continuation-in-part of Ser. No. 229,683, Apr. 19, 1994, abandoned.

[51] Int. Cl.$^6$ ............................. B65D 81/02; B65D 85/38
[52] U.S. Cl. ........................ 206/522; 206/320; 206/591; 383/3
[58] Field of Search ........................ 206/522, 591, 206/320; 383/3

[56] References Cited

U.S. PATENT DOCUMENTS

| | | | |
|---|---|---|---|
| 3,005,567 | 10/1961 | White | 206/522 |
| 3,949,879 | 4/1976 | Peterson et al. | 206/522 |
| 4,145,973 | 3/1979 | Baxter | 206/522 X |
| 4,801,213 | 1/1989 | Frey et al. | 383/3 |
| 5,005,679 | 4/1991 | Hjelle | 206/522 X |
| 5,180,060 | 1/1993 | Forth et al. | 206/522 |
| 5,263,587 | 11/1993 | Elkin et al. | 206/522 |
| 5,622,262 | 4/1997 | Sedow | 206/522 |

FOREIGN PATENT DOCUMENTS

| 1000728 | 10/1951 | France | 206/522 |
|---|---|---|---|

*Primary Examiner*—Bryon P. Gehman
*Attorney, Agent, or Firm*—Abelman, Frayne & Schwab

[57] ABSTRACT

A support for an article of electronic equipment, such as a personal computer, includes a bolster pressurized with a gas, and which provides a pneumatic spring in surrounding relation with side edges of the article, the bolster being comprised of an inflatable bladder and a constraining non-expansible sleeve which acts as a corset for the bladder and permits inflation of the bladder to a pressure in excess of that which would cause ballooning of the bladder.

19 Claims, 7 Drawing Sheets

FIG.12B BIAS

FIG.12A STRAIGHT

HIGH PRESSURE AIR CUSHION FOR ELECTRONIC EQUIPMENT

This application is a continuation-in-part of U.S. application Ser. No. 08/383,292 filed Feb. 2, 1995, now U.S. Pat. No. 5,622,262 which itself is a continuation-in-part of U.S. application Ser. No. 08/360,013, filed Dec. 20, 1994, now abandoned, which itself is a continuation-in-part of parent U.S. application Ser. No. 08/229,683, filed Apr. 19, 1994, now abandoned.

FIELD OF THE INVENTION

This invention relates to a device to be incorporated into an item of luggage, such as a portfolio, a briefcase, or a suitcase, which will provide support for an article of electronic equipment, such as a personal lap-top computer, a video tape recorder, an electronic camera, or portable electronic scientific instruments during transportation of the article within the item of luggage.

BACKGROUND OF THE INVENTION

It is well-known that electronic equipment, such as a lap-top personal computer commonly is transported by the owner in a portfolio or briefcase.

It is also well-known that cases for transporting articles, such as camcorders, cameras, lap-top computers, and also portable electronic scientific instruments, commonly are padded with a shock-absorbing material, typically, padded velvet, or a foamed plastics material.

Commonly, in addition to providing a shock-absorbent padding for the article to be carried, such cases commonly are provided with straps for retaining the article against displacement within the padding.

Materials such as velvet or foamed plastics material tend to build up electrostatic charges, particularly in the event that the article being carried can rub or slide relative to the padding, and in turn, tend to attract and become contaminated with dust and other air-borne particulate materials. Further, such electrostatic charges can have disastrous effects on information stored within a computer, or data stored in other articles of electronic equipment.

There has been prior proposed in U.S. Pat. Nos. 5,217, 131, 4,793,123, 4,826,329, and 4,551,370, to provide a pneumatic cushion within a box or within an item of luggage, in the form of an inflatable liner that can be pressurized with air, thus to provide a pneumatic cushion for supporting the articles contained therein, and, which will act as a pneumatic spring protecting the article in the event that the box or item of luggage is accidentally dropped.

It has, however, been found that such pneumatic cushions can only absorb relatively limited force before they rupture, and further, that such pneumatic cushions occupy, when in an inflated condition, occupy a very considerable portion of the interior volume of the box or item of luggage. Further, such pneumatic cushions can rupture when in a low pressure environment, such as an aircraft.

Experimentation has established that dropping a weight of approximately 5.9 pounds from a height of 30 inches can produce a G force in excess of 1200G. A force of this magnitude causes displacement of the stored article within the pressurized liner, and, unless the liner is made of thick and heavy material, easily can cause rupturing of the liner, and total collapse of the pressurization thereof.

Attempts to strengthen the liner have taken resort to either increasing the volume of the liner, with a consequential decrease in the available storage area within the box or the item of luggage, or, thickening of the membrane of the liner, with a consequential increase in the weight of the liner. Both approaches have disadvantages, either in reducing the interior volume of the box or item of luggage, or, increasing the weight thereof.

The major problem is that the liner can only be inflated to a relatively low pressure. If inflated to a higher pressure, this caused ballooning of the liner, with a consequential further decrease in the available storage volume of the box or item of luggage, and even greater risk of the liner rupturing when the box or item of luggage is subjected to a substantial impact. Additionally, there is a tendency for the stored article to shift within the storage volume, with an increased possibility of impaction on a corner of the stored article, this being due to the air contained within the liner being free to move randomly to a region of lower pressure within the liner.

OBJECT OF THE INVENTION

It is an object of this invention to provide a support for an item of luggage, in which an article of electronic equipment can be carried with safety, and which, to the greatest possible extent, improves the cushioning effect on the stored article, while at the same time minimizing the storage volume taken up by the liner within the box or item of luggage, and which further, reduces the possibility of the liner being ruptured upon impaction of the box or item of luggage.

It is also an object of this invention to eliminate the problems of contamination of the padding by electrostatically attracted lint, dust, and other airborne particulate materials, and, which also eliminates the disastrous consequences of an electrostatic charge being developed on the outer casing of the article of electronic equipment, and, the effects of that electrostatic charge on the information stored within a computer memory of that equipment.

SUMMARY OF THE INVENTION

According to the present invention, a liner for an item of luggage is provided by a pressurized gas filled cushion member.

The pressurized gas filled cushion member is in the form of an inflatable bladder, which is contained within a sheath providing a reinforcement layer formed from a flexible material that has high resistance to stretch of the sheath in any direction.

A simple weave textile fabric woven of monofilaments preferably is employed as the sheath, the warp and weft of the fabric either being aligned longitudinally and transversely of the length of the cushion member, or, also preferably, being arranged with the warp and weft extending on a bias angle to the longitudinal axis of the cushion member.

The sheath completely envelops the inflatable bladder, thus providing a positive constraint against expansion of the bladder to any volume larger than the internal volume of the sheath.

As the sheath has exceptionally high resistance to stretching in any direction, the contained inflatable bladder then can be pressurized to a higher pressure than bladders that are not reinforced by a sheath.

Typically, a lap-top computer including its contained batteries will weigh approximately 5.9 lbs. Some lap-top computers weigh slightly less, whereas other lap-top computers weigh slightly more. For the purpose of this discussion, a lap-top computer weighing 5.9 lbs. has been selected.

For the purpose of performing the tests now described, a wooden block simulating the shape of a lap-top computer, and which weighed 5.9 lbs. was used as a substitute for a lap-top computer, and was dropped onto a concrete floor.

Dropping of that block from a height of 30 inches produced G forces that in three separate tests were 1,240G, 1,200G, and, 1,280G.

The same block was then housed within a carrying case, and, the identical test was performed under the identical conditions, which involved dropping the case and the contained wooden block by a height 30 inches, this test being performed in the absence of a cushion member, such as is taught by the present invention. Under these conditions, and in three separate tests, G forces of 720G, 1000G and 1,080G were detected.

Further tests were then conducted in the presence of the cushion member of the present invention, when inflated to different extents of pressurization.

Surprisingly, measurements show that the G force applied to the block when contained within the carrying case, and dropped onto a concrete floor from a height of 30 inches, which is the usual height of a desk top, reduced to a far greater extent than was to be expected.

For example, pressurization within the cushion member of 6 lbs per square inch produced a G force in a block simulating the contours of a lap-top computer, and which weighed 5.9 lbs., which on three consecutive tests when dropped by 30 inches, was 296.0G, 144.0G and 304.0G. The variations in G force are attributable to the attitude in which the case containing the lap-top computer impacts on the ground, which can be on one corner, or flat on the bottom, or, as a result of the case impacting on a surface which is not completely flat.

An increase in the pressurization with the cushion member to 12 lbs. per square inch under the same conditions produced significant reductions in G force of 84.0G, 74.0G and 78.0G.

Further increasing the pressurization within the cushion member to 25 lbs. per square inch then produced the startling information that under the same conditions, the G force was reduced to 32.8G, 34.8G and 44.8G.

The experiment was then repeated employing a different case under identical conditions in which the pressurized air cushion had been eliminated. G forces under identical conditions then reached 1,220G, 640G, and 1,260G.

The addition of a cushion member pressurized to 6 lbs., under identical conditions, then produced G forces of 280.0G, 232.0G and 280.0G.

An increase in the air pressure in the cushion member to 12 lbs., under identical conditions produced reduced G forces of 70.0G, 78.0G and 74.0G.

An increase in the pressurization of the cushion member to 25 lbs., under identical conditions produced reduced G forces of 40.0G, 50.4G and 53.6G.

Possibly, further decreases in the G force are obtainable by increasing the pressurization within the cushion member to more than 25 lbs. per square inch. Such further testing was precluded owing to break down of the test equipment.

The effect produced can be likened to that of the support of an innertube by automobile or bicycle tire, or, the constraint imposed on an otherwise insubstantial hose formed of a flexible plastics material, by incorporating cords into the tire or into the hose that are highly resistive to elongation. This permits the innertube of the tire to be inflated to a pressure greatly in excess of that which would cause ballooning of the innertube, and, similarly permits internal pressures within the hose in excess of that which would cause ballooning of the hose. Also, such constructions become relatively less compressible and more rigid as the pressure within the innertube or within the hose is increased, this providing a greatly enhanced pneumatic spring force or hydraulic spring force resisting collapsing of the tire or hose when subjected to localized pressure.

In one preferred embodiment, the sheath is woven separately from the bladder, which is then inserted into the cavity of the sheath, by drawing the bladder longitudinally into the sheath prior to inflation of the bladder.

In another preferred embodiment, the sheath itself is made air impervious by providing an air impervious coating on the inner surface thereof defining the cavity.

In another preferred embodiment, woven textile material is coated with an air impervious plastics material, coated surfaces of the textile sheets are then brought into contact, and are then sealed to each other by well-known heat sealing techniques, ultrasonic techniques and the like.

In this event, multiple cushion members can be provided that are interconnected one with the other by channels for the pressurizing gas, the cushion members preferably being arranged in parallel relation in the form of elongate tubes. Such a construction permits ready bending of the cushion member through a right angle, even when inflated to high pressure. Preferably, in order to assist in such bending movements, transverse seals that will permit the passage of pressurizing gas are provided at appropriate locations along the parallely arranged cushion members.

By arranging the cushion members in a parallel configuration, the respective cushion members can be made of lesser transverse dimensions when inflated, while in combination providing an enhanced cushioning effect. This decreases the volume of the cushioning members, and in turn either increases the available storage volume in the box or item of luggage, or, in the alternative, permits a decrease in the external dimensions of the box or the item of luggage.

Another preferred embodiment of the invention involves the positioning of the reinforced cushion member within a further sheath, also formed of a non-stretchable fabric material, to further reinforce the cushion member, and permit inflation of the cushion member to a still higher pressure without fear of rupture.

The cushion members each can be of single cell construction, or of multiple cell construction, or each can be constructed of multiple interconnected cells configured to embrace and hold an article of electronic equipment of specific shape and dimensions when positioned between the cushion members.

When positioned between the cushion members, the article is supported in floating relationship relative to the box or item of luggage, the respective cushion members acting as an pneumatic spring suspension for the article.

When so supported, any attempted movement of the article relative to the cushion members is negated, thus eliminating rubbing or sliding of the article relative to the cushion members that could cause the build-up of an electrostatic charge on the casing of the article.

The cushion members themselves can be adhesively attached to an inner wall of the item of luggage, such as by press-studs, double-sided "carpet" tape, or, can be attached by Velcro (registered) tapes, and preferably are attached to the luggage in a manner permitting removal of the cushion members from the item of luggage for cleaning of the cushion members and the interior of the item of luggage.

Additionally, the cushion members can be fabricated from an electrically conductive elastomer, or plastics material providing for the ready dissipation of electrostatic charges present on the article of electronic equipment, and that are developed during positioning of the article between the cushion members. Electrically conductive elastomers and plastics materials are well-known in the art, including plastics sheeting having a vapor deposited metal coating on one surface thereof, and, elastomers and plastics materials having graphite or carbon particles embedded or matrixed therein.

For enhancement of the structural strength of the cushion members when incorporating such electrically conductive materials, the cushion members can be formed of a laminate of an air impervious plastics material having an outwardly presented facing of an electrically conductive plastics material.

DESCRIPTION OF THE DRAWINGS

Preferred embodiments of the present invention are now described with reference to the accompanying drawings, in which.

DESCRIPTION OF THE PREFERRED EMBODIMENTS

A preferred embodiment of the invention is shown in FIGS. 1 through 4 of the drawings, this particular embodiment being that of a cushion member that can be sold to the public as a packaged unit, and installed by the purchaser in an existing portfolio, or, by the addition of a divider as later described, can be installed in a briefcase.

The cushion member of the present invention, in one preferred embodiment, comprises three bolsters 10–14, of which the bolster 10 is of a length appropriate to its insertion into the base of a portfolio, the length of the bolster 10 being slightly less than the standard 16 inches length of a portfolio.

The bolsters 12 and 14 each are slightly less in length than one-half the length of the bolster 10, in order that the respective bolsters 12 and 14 can be folded reversely about hinges 16 and 18 for them to lie in parallel relation with the bolster 10. When so folded, the unit is one which readily can be packaged for sale to a purchaser, it being left to the purchaser to install the cushion member in the purchaser's pre-existing portfolio.

Figure 1:
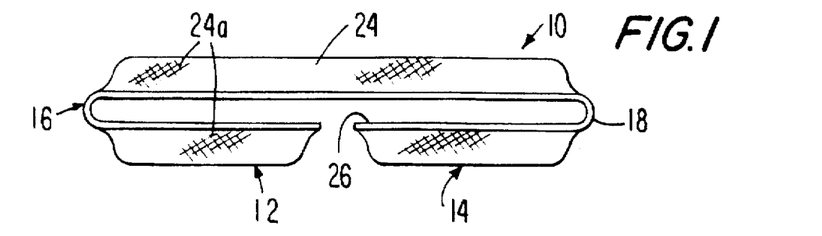
FIG. 1 is a side view of the air cushion of the invention in the form of pre-pressurized bolsters which have been folded onto each other ready for packaging and display at the point of sale.

In order to install the air cushion of FIG. 1 in any existing portfolio, the bolster 12 is rotated about the hinge 16 in a clockwise direction, and the bolster 14 is rotated about the hinge 18 in a counterclockwise direction such that the bolsters 12 and 14 extend upwardly of the bolster 10, and in a position in which the cushion member can be inserted into a compartment, preferably the central compartment of a portfolio, the bottom and end walls of which are indicated at 20, 21, and 22. The portfolio itself can be a conventional portfolio having a top opening and preferably three interior vertically arranged compartments, the cushion member of the present invention preferably being fitted within the central compartment, the computer thus being protected by the walls of the central compartment and articles that are stored in the compartments on opposite sides of the central compartment.

Referring now to FIG. 1, a preferred embodiment of the cushion member of the present invention is formed from two strips of plastics material 24 and 26 that have been bonded to each other continuously along the longitudinal edges of the strips. Preferably, the strip 26 is of greater resistance to bending than the strip 24, and, preferably, the strip 24 is of greater width than the strip 26, in order for it to assume an arched condition relative to the strip 26 when the cushion member is pressurized.

The strip 26 conveniently is a strip of a non-woven air impervious plastics material in ribbon form.

In contra-distinction, the strip 24 is comprised of a strip of flexible plastics material, such as polyvinyl fluoride. Polyvinyl fluoride inherently is stretchable in all directions, the extent of stretching of the sheet material being dependent on the pneumatic pressure existing within the cushion member 10. Prior to the present invention, the pressurization of the cushion member 10 could not exceed that pressure at which the material of the strip 24 commences to balloon, which will occur first in that location of the strip 24 that is of least thickness, and thus, more easily rupturable.

In order to eliminate that problem, the present invention employs a gas-impervious strip of plastics material which has incorporated therein a simple weave fabric material comprised of axially straight warp and weft threads or monofilaments. As is illustrated in FIG. 1(A), the woven fabric material can be incorporated into the strip 24 by sandwiching the woven fabric material 24(a) between sheets of plastics material 24(b) and 24(c), and then heat-rolling the composite structure to cause the respective plastic strips 24(b) and 24(c) to be pressed into the interstices of the woven fabric 24(a), thus cause the mating faces of the strips 24(b) and 24(c) to fuse to each other and to the woven fabric 24(a) at the interstices of the woven fabric 24(a).

Figure 1A:
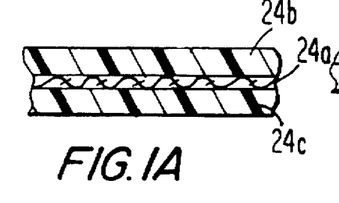
FIG. 1A illustrates one form of sheet plastics material employed in performing the present invention, FIGS. 1B & 1C illustrating alternative constructions.
Figure 1B:
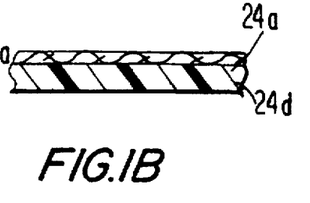

Alternatively, as shown in FIG. 1B, a single sheet of plastics material is heat-rolled onto the woven fabric material 24(a) on that surface of the woven fabric material that is presented inwardly of the cushion member. This construction is preferable in that it permits the strip of plastics material 24(d) to be of minor thickness, pressure existing within the cushion member being inoperative to extrude the plastics material 24(d) through the interstices of the woven fabric 24(a).

Figure 1C:
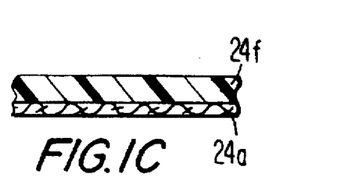

In the alternative, as illustrated in FIG. 1C, the woven fabric can be adhered to that surface of the plastics sheet 24(f) that is presented inwardly of the cushion member. Such a construction is far less preferable in that it requires the plastics sheet material to be of considerably greater thickness than that required in the construction of FIG. 1B.

Proceeding from the illustrations in FIGS. 1A and 1B, as will be clearly apparent, instead of heat-rolling pre-formed plastics sheeting onto the woven fabric 24(a), the equivalent construction can be obtained by immersing the woven fabric material 24(a) in a plastisol, and, then permitting the plastisol to cure on the opposite surfaces of the woven fabric 24(a). In FIG. 1B, the plastisol, prior to curing, can be sprayed or roller applied on one surface of the woven fabric 24(c), thus to produce an air impervious barrier carried by the woven fabric 24(a).

In the alternative, the strip 24 can be formed by a continuous extrusion and wrapping operation by well-known machinery as used in the covering of electrical cables, but appropriately formed to a larger diameter.

The longitudinally edge seamed strips 24 and 26 can then be sequentially sealed to each other in the transverse direction, while at the same time a compressed gas, such as compressed atmospheric air, or an inert gas such as nitrogen is injected between the strips 24 and 26, thus to produce a continuous sequence of pressurized bolsters 10–14. This readily can be done in a continuous operation using conventional techniques employed in the assembly of articles from sheet plastics material.

Subsequently, a complete unit of bolster 10 and bolsters 12 and 14 is severed from the continuous length of assembled bolsters by severing the continuous length transversely at appropriate locations in order to provide individual units comprised of a single bolster 10 and dual bolsters 12 and 14.

The sealed and permanently pressurized units are then folded in the manner illustrated in FIG. 1 in which they easily can be packaged in the known manner, such as in a box, or in a bag. Alternatively, the bolsters can be provided with a filler nozzle for compressed air as later described with reference to FIG. 13.

Figure 2:
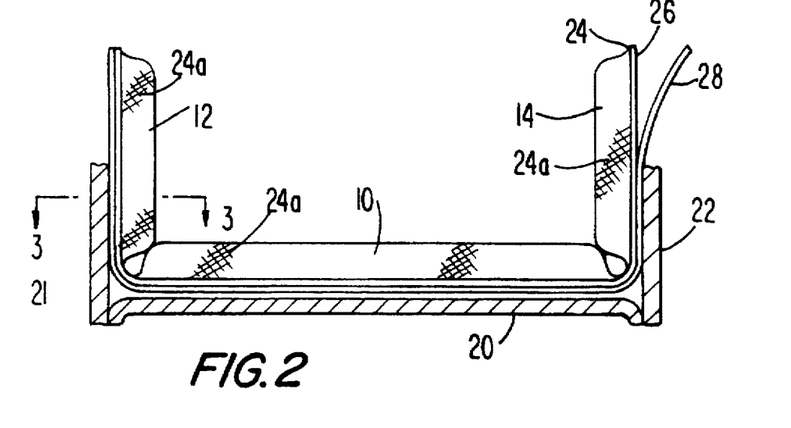
FIG. 2 is a view corresponding with FIG. 1, but showing the bolsters in the position they occupy when inserted into a portfolio.

Referring now to FIG. 2, optionally, the outwardly presented surface of the strip 26 can be coated with an adhesive, which is covered by a continuous length of peel-off tape 28, the application of the adhesive to the outer face of the strip 26 and the application of the peel-off tape 28 conveniently being effected during the manufacture of the cushion member, and in a continuous operation.

Having obtained the packaged product, the purchaser then merely is required to peel off the tape 28, insert the cushion member into the central compartment of an existing portfolio, and then, press the adhesive strip 26 into intimate contact with the inner walls of the existing portfolio.

Figure 3:
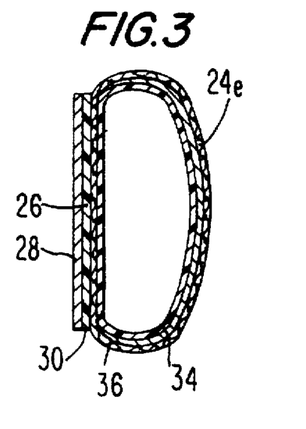
FIG. 3 is a cross-section taken on the line 3—3 of FIG. 2, and showing a modified construction of the bolsters.
Figure 4:
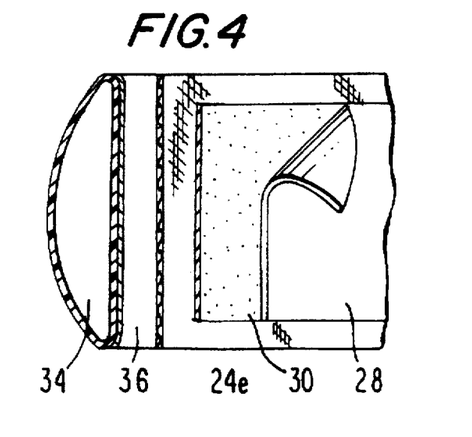
FIG. 4 is a diagrammatic side elevation of FIG. 3, illustrating one manner of construction of the air cushion of the invention.

As an alternative to applying adhesive directly to the outer surface of the strip 26, a continuous strip of what is known as double-sided carpet tape can be applied directly to the outer surface of the strip 26, the carpet tape itself including a peel-off tape 28 that is removable by the purchaser, as indicated in FIGS. 3 and 4.

Having installed the inflated air cushion within the central compartment of an existing portfolio, it is then merely necessary for the purchaser to insert an article of electronic equipment, such as a personal laptop computer, into the central compartment. Laptop computers, while generally similar in dimensions, are not identical in dimensions. Variations in size of the lap-top computer can be accommodated and the computer held securely within the portfolio, the cross-section of the respective bolsters 10–14 being capable of flexing in order to accommodate a wide variety of laptop computers of varying dimensions.

Figure 7:
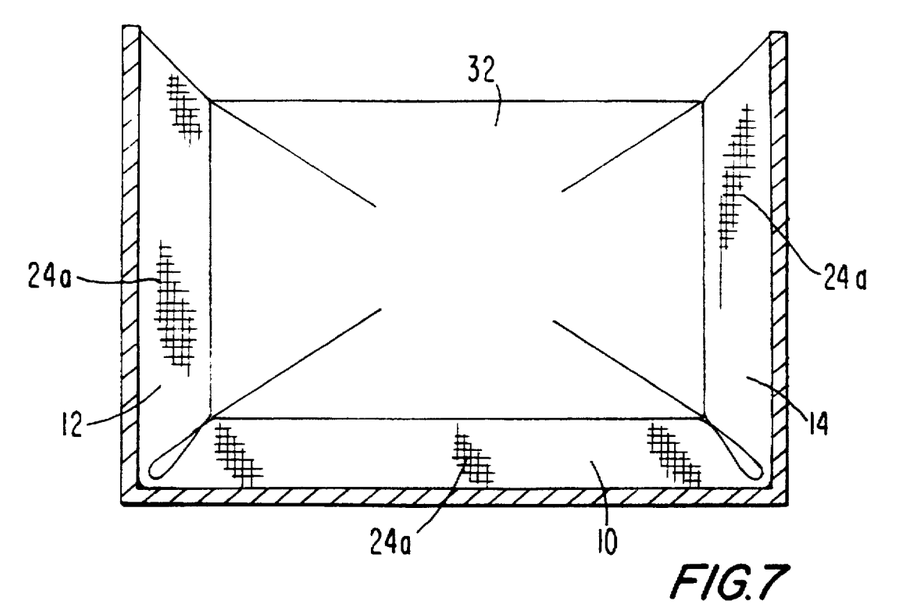
FIG. 7 illustrates the basic concept of a pneumatic spring suspension for an article of electronic equipment, such as a laptop computer.

As more clearly illustrated in FIG. 7, the weight of the personal lap-top computer 32 is then supported on the cushion member provided by the bolster 10, while at the same time it is stabilized against sideways movement by its engagement with the cushion members provided by the bolsters 12 and 14. Thus, if the portfolio should be dropped, or its ends impacted by an object, the contained laptop computer is protected against jarring shocks.

Alternatively, and as illustrated in FIGS. 3 and 4, the air cushion of the present invention can be formed from a continuous length of tubing of extruded or drawn plastics material as indicated at 34, which has been wrapped by threads 24(e) during the manufacture thereof, in which event the carpet tape 30 and the peel-off tape 28 can be applied directly to the wrapping 24(e) prior to the inflation of the tube 34, thus enabling the air cushion of the present invention to be manufactured in a continuous operation, or, alternatively, and if desired, in a unit by unit operation.

One of the major problems affecting laptop personal computers is the possibility of electrostatic charges being formed in the vicinity of the computer, and, the effect of such electrostatic charges on the electrical circuitry of the computer, with possible loss of the information stored therewithin.

In order to prevent or minimize the possibility of electrostatic fields being built up on the cushion members by the frictional engagement of the bolsters with the casing of the computer 32, preferably, the bolsters 10–14 are formed from strip plastics material that has been coated on the outwardly presented faces thereof with an electrically conductive material as indicated at 36. The electrically conductive coating 36 can be a metal vapor deposited electrically conductive coating, or, can be a coating of an electrically conductive carbon or graphite adhesively applied to the outer surface of the bolsters 10–14, or, as is illustrated in FIG. 4, the coating 36 can be a laminate applied to the outer surface of the tubing 34, or, to the strip plastics material 24 and 26 or to the woven fabric material 24a in the embodiments of FIGS. 1 and 2.

If, now, the computer 32 has developed electrostatic charges on its surface prior to its being inserted into the portfolio, any such electrostatic charges are bled off and dissipated by the electrically conductive coating of the respective bolsters 10–14, as are electrostatic charges produced by the act of inserting the computer into seated relation with the bolsters 10–14.

FIGS. 1–4 illustrate embodiments of the present invention in which the respective bolsters 10–14 each are formed as a single compartment containing compressed gas. As will be apparent, in the embodiments of FIGS. 1–4, each of the bolsters 10–14 can be formed of multiple compartments, which are either separate from one another, or, which are interconnected with one another, as is now described.

Figure 5:
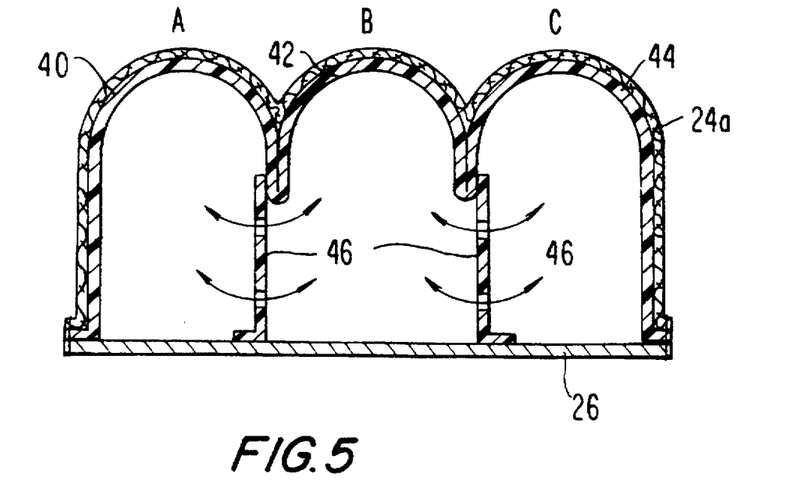
FIG. 5 is a diagrammatic cross-section through an alternative form of air cushion according to the present invention.
Figure 6:
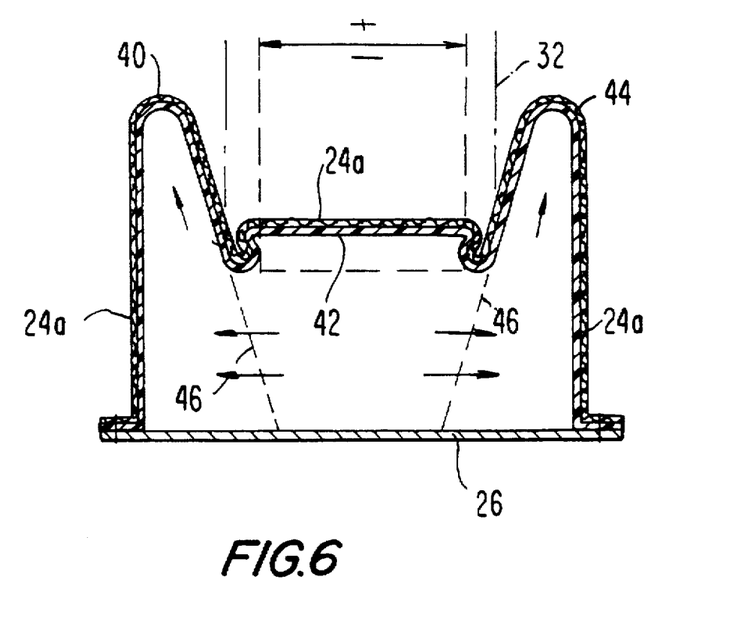
FIG. 6 shows the air cushion of FIG. 5 when in a stressed condition.

A particularly advantageous modification is illustrated in FIGS. 5 and 6 of the drawings, in which the strip 24 and woven fabric overlay 24(a) of the respective bolsters 10–14 is formed in three separate sections 40–44, one edge of the sections 40 and 44 being connected directly to the strip 26. The other edges of the sections 40 and 44 are connected to the intermediate section 42, the connection between the sections 40 and 42, and the connection between the sections 42 and 44 being directly connected to the strip 26 by perforate webs 46 of a compatible plastics material.

In this configuration, at the time a computer 32 is placed edgewise on the air cushion, the section 42 will be forced downwardly, and will be moved into a flattened condition as shown in FIG. 6. This increases the distance between the webs 46 at the juncture with the respective sections 40–42 and 42–44. This in turn will cause the sections 40 and 44 to be displaced upwardly such that the sections 40 and 44 embrace and hold the computer 32 at the edges thereof, and will prevent lateral movement of the computer 32, which is then embedded within the bolster. A further advantage of this construction is that it will accommodate a wide range of thicknesses and dimensions of computers of different manufacture, as is indicated by the dotted lines 32a in FIG. 6, the bolsters themselves acting as pneumatic springs in the event that an impact is made on the structure supporting the respective bolsters.

FIG. 7 illustrates the manner in which a personal computer 32 can be supported in a vertical orientation within a portfolio, such that it is supported at its side edges and lower edge by pneumatic springs provided by the bolsters 10–14.

Figure 8:
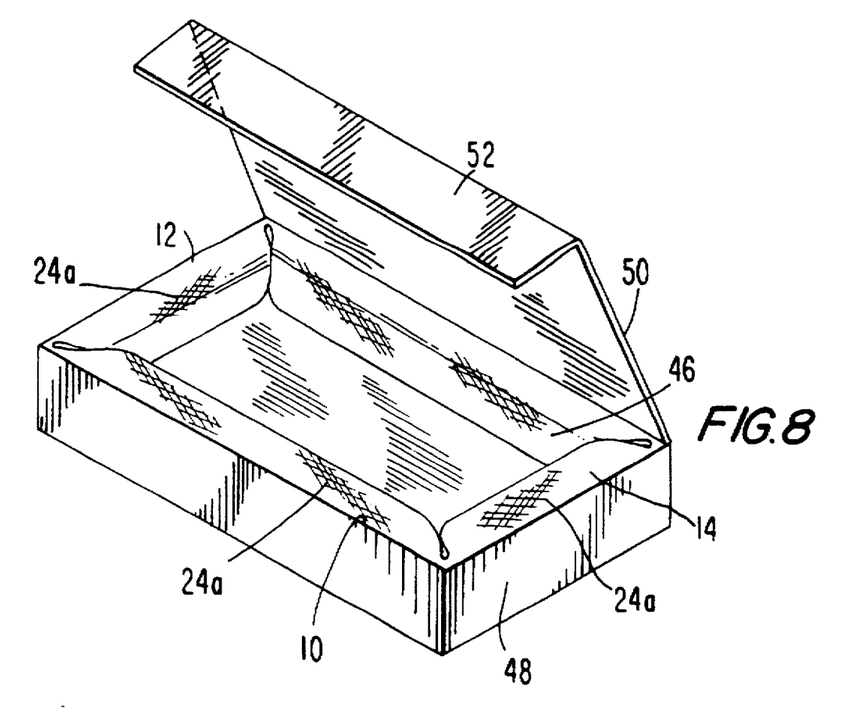
FIG. 8 illustrates an alternative form of air cushion having four bolsters inserted into a box, suitable for insertion into a suitcase, briefcase or portfolio.

Another situation can arise, in which the user wishes to store the personal computer in a conventional article of luggage such as a suitcase, in that event, the bolsters 10–14 and an additional bolster 46, which can be formed unitarily with the bolsters 10–14 can be positioned within an appropriately dimensioned box 48 having a lid 50 and a fold-down tab 52, that conveniently can be attached to the box 48 by a Velcro (registered) fastener strip.

Figure 9:
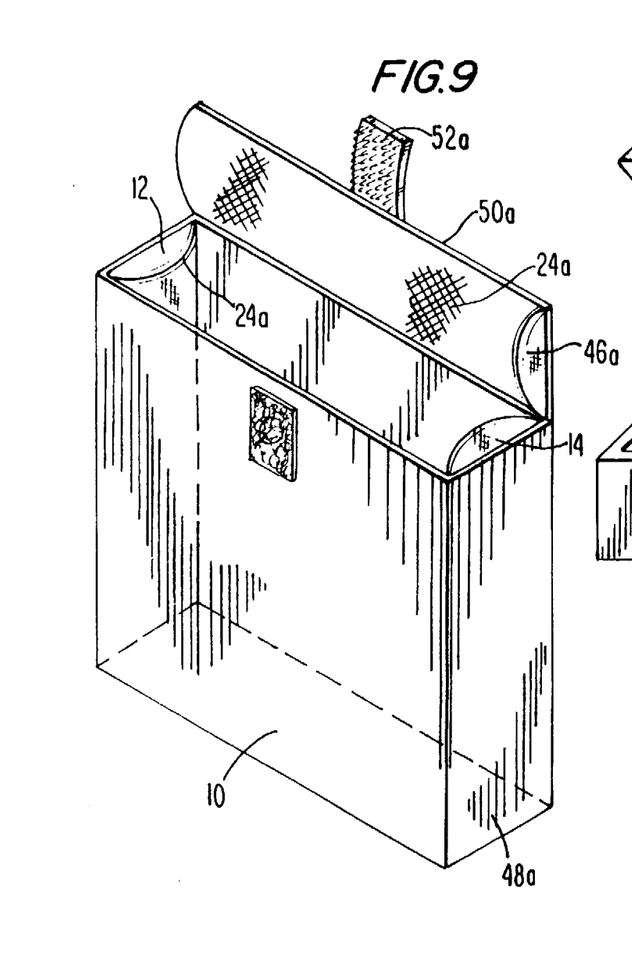
FIG. 9 illustrates an alternative form of box similar to that shown in FIG. 8.

In the alternative, and as illustrated in FIG. 9, the box 40a can be provided with a lid 50a forming one side edge thereof, the additional bolster 46a having been adhesively affixed to the lid 50a, a Velcro tab 52a being provided for holding the lid 50a securely closed.

Figures 10, 11:
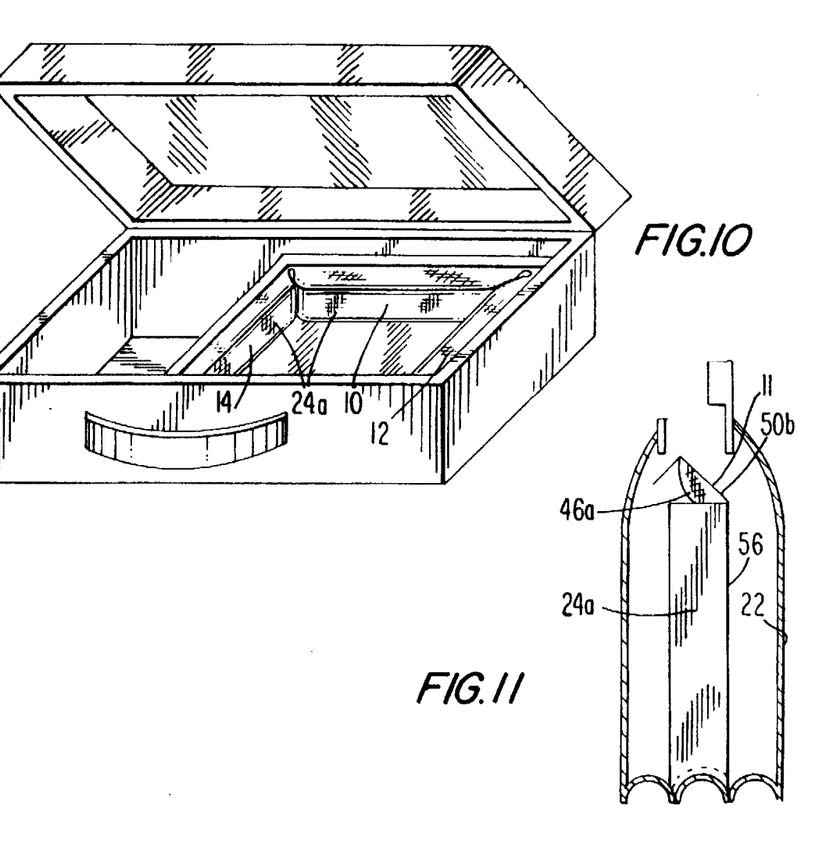
FIG. 10 shows a briefcase having a compartment with an air cushion of the type shown in FIG. 9 permanently installed therein.
FIG. 11 is a diagrammatic cross-section through a portfolio illustrating the manner in which an air cushion of the present invention can be installed within an existing portfolio.

As illustrated in FIG. 10, a case in the form of a briefcase or a hard case such as an overnighter, can be provided with a divider 54 and an appropriate arrangement of bolsters 10–14, and if desired, an additional bolster such as the bolster 46, this enabling a computer to be fitted into the briefcase.

As is illustrated in FIG. 11, the divider walls 56 of a portfolio 22, are coated on one or both sides with an electrically conductive metal foil, further to enhance the dissipation of electrostatic charges, the portfolio 22 optionally being provided with a fold down flap 50b and an additional bolster 46b in the manner described with reference to FIG. 9.

The constructions so far described with reference to FIGS. 1–11, with the exception of FIGS. 5 and 6 each have described air cushions having a single pressurized longitudinally extending cavity. The provision of a single longitudinally extending cavity carries with it the disadvantage that the air cushion is of considerable thickness as related to its length and width, the thickness of the air cushion occupying a considerable volume within the cavity in which it is located.

The embodiments of FIGS. 12–17 specifically are directed at minimizing that disadvantage, while at the same time securing all of the benefits of the present invention in permitting inflation of the cushioning device to pressures far in excess of those that could be accommodated by a cushion member comprised of expandable plastics material alone.

Figures 12, 12A, 12B, 13:
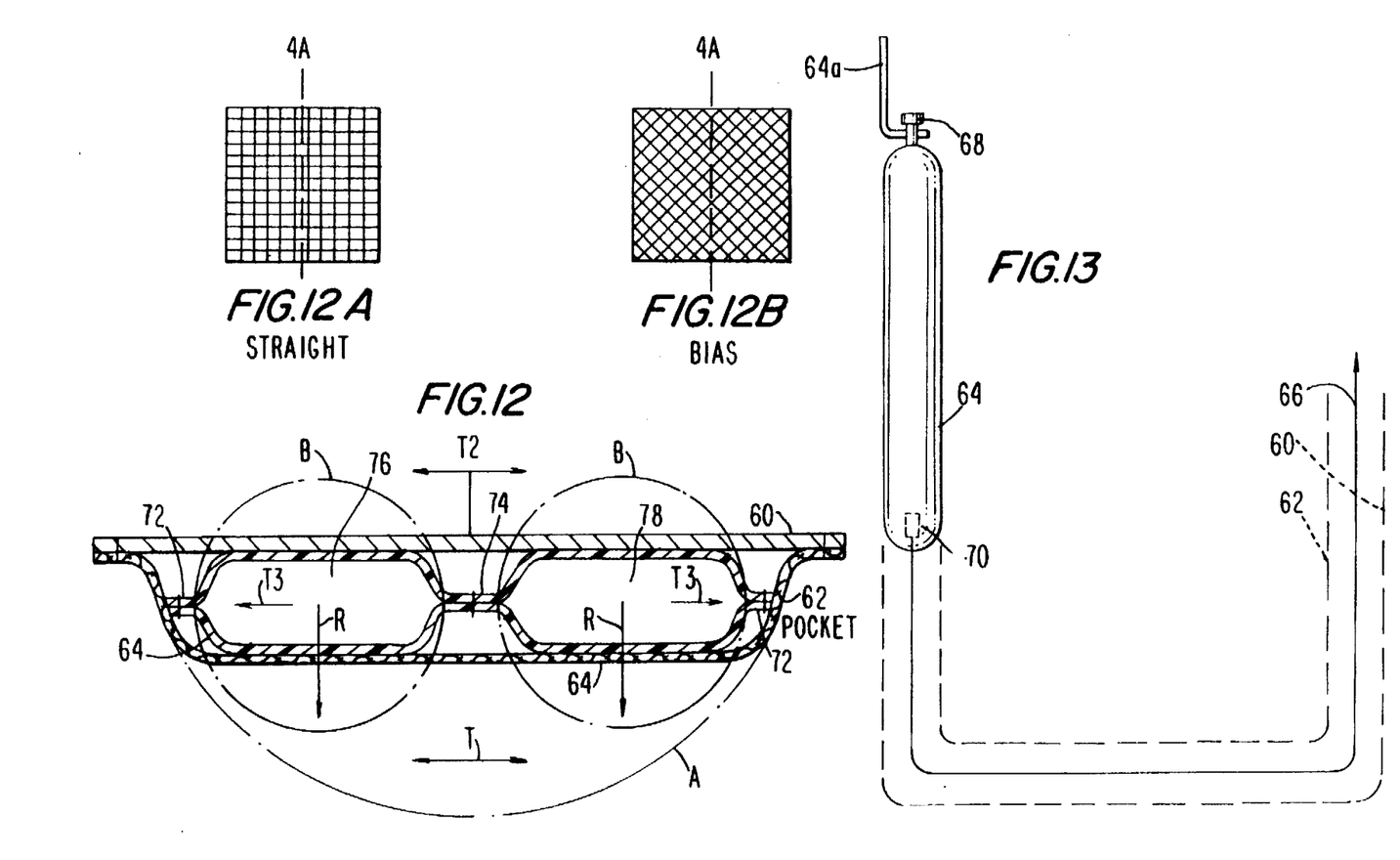
FIG. 12 is a transverse cross-section to another preferred embodiment of air cushion according to the present invention.
FIGS. 12(A) and 12(b) are illustrative of alternative weaved to be employed in performing the present invention.
FIG. 13 is an illustration of how the inflatable bladder of the present invention can be inserted into its constraining sheath.

Referring now to FIG. 12, a wall of a conventional box, suitcase, brief case or portfolio is indicated at 60.

Typically, the wall 60 will be elongate and have a longitudinal axis representing the length of the wall of a length considerably in excess of the transverse axis representing the width of the wall. The wall itself can be formed of any material, but preferably is formed of a semi-rigid material that will resist lateral bending of the wall 60.

Attached to the opposite longitudinal edges of the wall 60 and extending longitudinally thereof is a pocket member 62 formed of a fabric material that is highly resistant to stretching. The fabric material of the pocket can either be an uncoated material, or, it can be in the form of a laminate with flexible plastics material, as previously discussed with respect to FIGS. 1A–1C.

Contained within the pocket is an inflatable bladder 64, which optionally can be formed from unreinforced plastics sheeting or the like, but which preferably also is formed from reinforced plastics sheeting, as described with reference to the preceding embodiments.

The bladder 64 is inserted into the pocket 62 prior to inflation of the bladder 64, at which time the bladder is entirely flaccid, and can readily be drawn through the pocket 62 by a suitable draw-cord 66 as illustrated diagrammatically in FIG. 13.

Also as illustrated in FIG. 13, preferably the bladder is provided at one end with a filler nozzle 68, and at its opposite end is provided with an eyelet 70.

This enables the bladder 64 to be drawn through the U-shaped pocket member, when the bladder is deflated, using the pull-cord 66 threaded through the eyelet. The bladder 64 then can be pressurized by an air pump applied to the nozzle 68, and the bladder expanded within the pocket 62, which acts in the manner of a corset for the bladder 64.

If, for any reason, the bladder fails, then, it can easily be replaced by snapping the eyelet of a replacement bladder 64(a) over the nozzle 68, and then withdrawing the damaged bladder 64 from the pocket 62 by pulling on the eyelet 70 of the bladder 64, the bladder 64 at that time functioning as a substitute for the pull-cord 66.

As is illustrated in FIG. 12, dual such inflatable bladders 64 are provided arranged in side-by-side planar relationship by providing a seam 74 in the bladder extending parallel to the edge seam 72 thereof. In this manner, while the bladder in an unflated condition it is in the form of a length of tape. When it is inflated, it provides two parallely arranged air cushions 76 and 78. By the provision of additional longitudinal seams 74, any desired number of cushion members can be provided in parallely arranged relation.

The advantage of constructing the bladder 64 of plural or multiple air cushion members is now discussed as related to FIG. 12.

In the event that a bladder having a single internal cavity was to be positioned within the pocket 22, and then inflated, then, the pocket 22 would assume an essentially semicircular configuration as indicated by the chain dotted lines A.

This would cause the air cushion to extend into the cavity of the box or article of luggage to a very substantial extent, this severely decreasing the usable volume of the box or article of luggage.

If now a bladder is employed having dual inflatable sections, if unrestrained, each of those sections will inflate as indicated by the dotted lines B, again imposing a restriction on the internal volume of the box or article of luggage.

If now a bladder having dual inflatable sections is inserted into the pocket 62, instead of those inflatable sections being capable of inflating to a radius indicated at R, the respective inflatable sections attempt to move away from each other in the directions of the arrows T2, this producing a tensile stress in the pocket member 62 as indicated by the arrows T, the tensile stress in the pocket member 62 acting to restrain the respective bladder sections 76 and 78, which themselves are backed by a relatively inflexible wall.

Thus, instead of moving into an arcuate form when viewed in cross-section, the pocket 62 assumes a substantially trapezoidal form, that form comprising a substantially flat inner face of the pocket member 62 presented to the cavity in the box or article of luggage flanked by two inclined side portions, the resultant inflated condition of the pocket 62 comprising far less of an intrusion into the volume of the associated box or item of luggage.

The pocket 62 has the effect of resisting expansion of the inflatable members 76 and 78 in the direction of the arrows R. However, the inflatable sections 76 and 78 are at that time being subjected to further pressurization, and, will be attempting to further expand. However, the only space available for expansion of the inflatable members is in lateral directions indicated by the arrows T3 in FIG. 12, the inflatable bladders being constrained against further extension by the pocket 62, whereas the spaces at the sides of the inflatable members are at atmospheric pressure. Thus, as they cannot expand into the semi-circular form indicated by the dotted lines B in FIG. 12, the respective inflatable members 76 and 78 expand laterally into a rectangular form, alongside of the rectangle extending substantially parallel to the backing member 60, and the short side of the rectangle extending transversely thereto and substantially perpendicular to the overlying pocket member 62.

Figure 14:
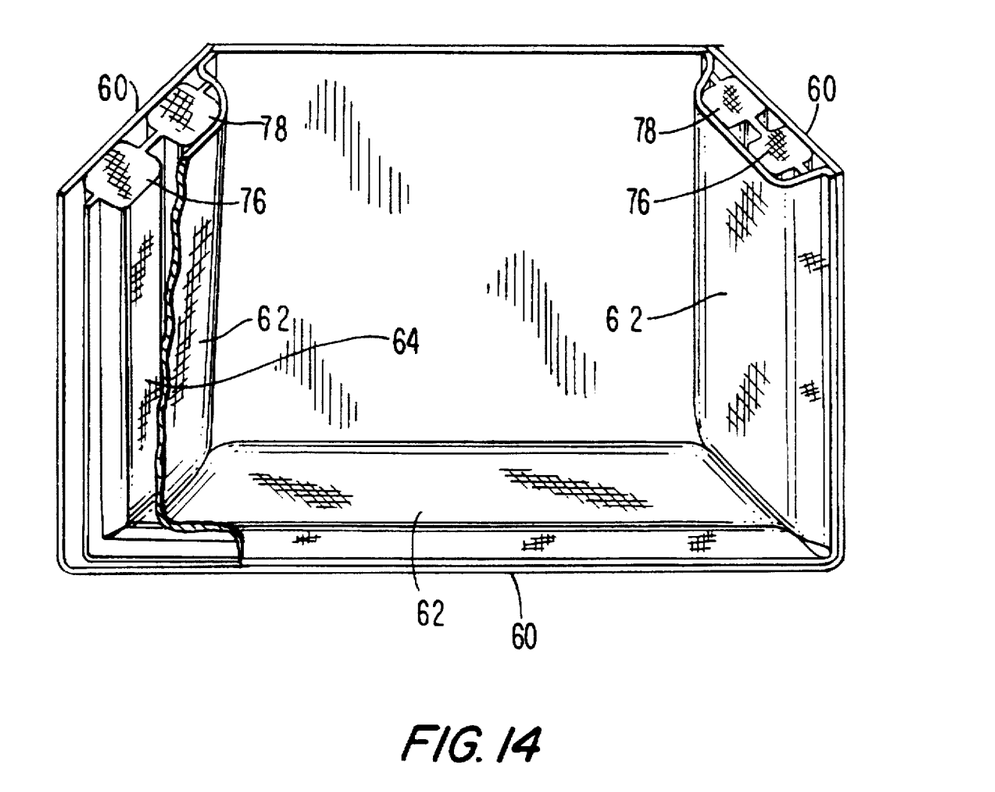
FIG. 14 is a diagrammatic cross-section through another form of air cushion according to the present invention.

FIG. 14 illustrates the cushion member of the invention when installed into a box or item of luggage, in order to illustrate the advantage of having dual or multiple inflatable sections of the inflatable bladders, the resultant effect being that a greater usable interior volume of the box or item of luggage is made available, this permitting the box or item of luggage to be of lesser dimensions for the same storage volume of the box or item of luggage.

Figure 15:
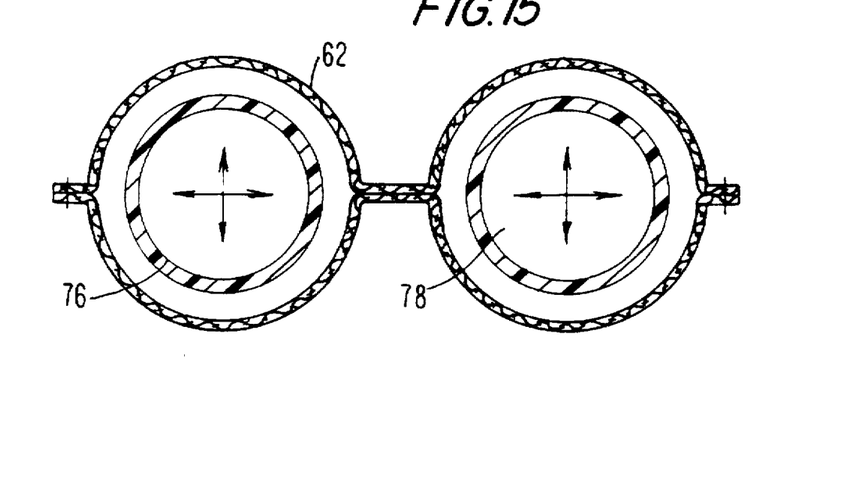

Referring now to FIG. 15, the pocket member 62 does not need to be directly attached to the wall of the box or to the wall of the item of luggage. Instead, and as previously described, it can be made entirely separate from the box or item of luggage for incorporation into an existing box or item of luggage.

In FIG. 15, the pocket member 62 is formed as a machine sewn pocket member providing two internal cavities, within which inflatable bladders 76 and 78 are received, the respective bladders each being provided with a filler nozzle similar to the filler nozzle 68 of FIG. 13.

In this embodiment, inflation of the respective bladder sections 76 and 78 will result in distension of the respective bladder sections 76 and 78 until they are restrained against further distension by the corset provided by the pocket member 62.

While in this construction the pocket members do not assume a substantially rectangular form, by providing multiple such bladder sections, which can be interconnected with each other, a cushion member can be provided having relatively small thickness as related to its width and length.

Figure 16:
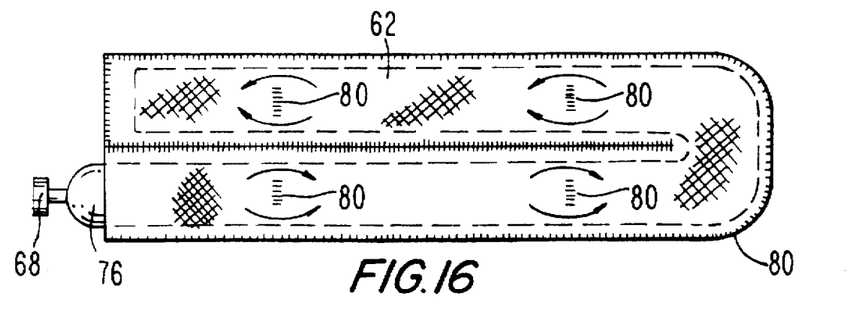
FIGS. 16 and 17 illustrate alternative preferred embodiments of the present invention; and, FIG. 15 illustrates the air cushion of the present invention when installed in a conventional box, suitcase, brief case or portfolio.

FIG. 16 illustrates one manner in which a cushion member can be formed. After inserting the inflatable bladder 76 into the pre-sewn pocket member 62, conveniently, crease-lines can be formed in the inflatable bladder by heat sealing the sections of the inflatable bladder partially across the width thereof, as indicated at 80. This permits folding of the cushion member and erection of the cushion member in the same manner as the embodiment of FIGS. 1 and 2.

Figure 17:
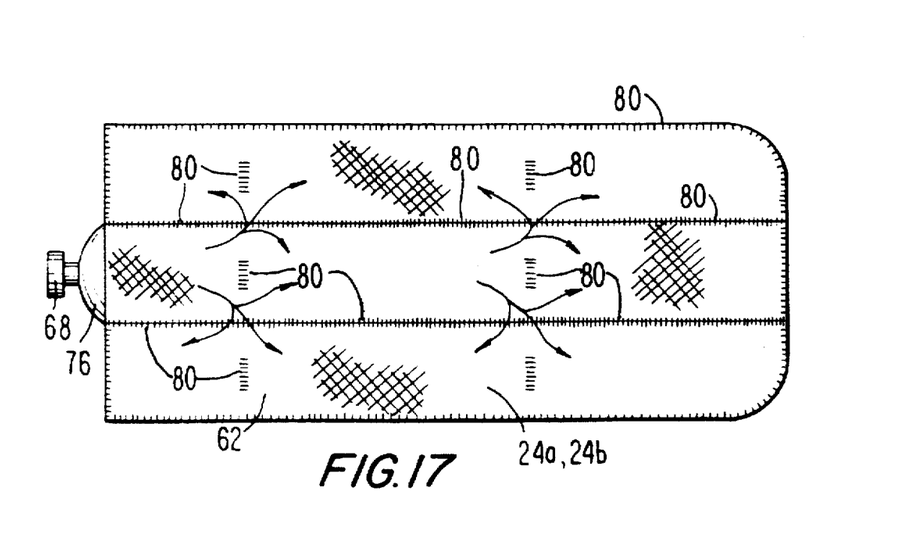

FIG. 17 illustrates the manner in which a cushion member having multiple cushion sections can be accomplished. In this embodiment, the cushion member is formed from dual sheets of material as described with reference to FIGS. 1A and 1B, which is then heat sealed along the lines 80, this providing triple inflatable cushion members each interconnected with the other, this enabling a further reduction in the thickness of the cushion member as previously described.

As will be appreciated, various modifications in the structures described above as preferred embodiments can be made, particularly as related to the size and shape of the respective bolsters, their positioning within a portfolio, briefcase, or other carrying case for a computer. As will be readily apparent to persons skilled in the art, the major objective of the present invention is to provide a support for a computer which acts in the manner of a pneumatic spring support, and which, optionally and additionally can provide for the dissipation of electrostatic charges.

Throughout the preceding description reference has been made to a personal or laptop computer. As will be clearly apparent, the structure described is of equal utility when transporting other delicate articles, such as video tape recorders, electronic cameras, calculators, scientific instruments, medical recording instruments, and the like, preferred embodiments of those structure also providing for the dissipation of electrostatic charges present on the article to be carried.

What is claimed:

1. A support for use in the transportation of an article of electronic equipment, said support being comprised of:

a pressurizable cushion member;

said cushion member being of elongate form and being receivable within a supporting structure;

said cushion member being comprised of an air-impervious, flexible and stretchable material providing an inflatable bladder, and a reinforcement layer of a flexible stretch resistant material secured to said air-impervious, flexible and stretchable material, said flexible stretch resistant material having a resistance to stretch sufficient to limit the extent of expansion of said bladder, thus permitting pressurization of said bladder to an internal pressure in excess of that which would cause ballooning of said bladder;

said cushion member acting as a pneumatic spring operative to isolate the article from impact shocks when positioned within said support.

2. The support of claim 1, in which said flexible stretch resistant material is coated with said air-impervious, flexible and stretchable material.

3. The support of claim 1, in which said flexible stretch resistant material is bonded to sheeting of said air-impervious, flexible and stretchable material.

4. The support of claim 1, including a coating of said flexible and stretchable material on opposite sides of said flexible stretch resistant material.

5. The support of claim 1, in which said flexible stretch resistant material is sandwiched between sheets of said air-impervious, flexible and stretchable material.

6. The support of claim 1, in which said air-impervious, flexible and stretchable material is a sheet of plastics material of capable of ultrasonic bonding to another sheet of said air-impervious flexible and stretchable material, to permit formation of said bladder from mutually presented sheets of said air-impervious, flexible and stretchable material.

7. The support of claim 1, in which said air-impervious, flexible and stretchable material is a sheet of plastics material capable of heat bonding to another sheet of said air-impervious, flexible and stretchable material to permit formation of said bladder from mutually presented sheets of said air-impervious, flexible and stretchable material.

8. The support of claim 1, in which said air-impervious, flexible and stretchable material is a sheet of plastics material capable of chemical bonding to another sheet of said air-impervious, flexible and stretchable material to permit formation of said bladder from mutually presented sheets of said air-impervious, flexible and stretchable material.

9. The support of claim 1, in which said flexible stretch resistant material is a fabric woven from stretch-resistant filaments.

10. The support of claim 1, in which said flexible stretch resistant material is a fabric woven from stretch-resistant monofilaments.

11. The support of claim 1, in which said cushion member includes plural inflatable bladders, and a reinforcement layer formed of a flexible material resistant to stretching of said flexible material enveloping said respective bladders.

12. The support of claim 1, in which said cushion member includes plural elements arranged in continuous strip form, and which each are comprised of elongate gas-pressurizable bolsters.

13. The support of claim 1, including means for adhesively attaching said cushion member to a said supporting structure within which a said article of electronic equipment is to be contained.

14. The support of claim 1, further including a coating of an electrically conductive material on said cushion member, said electrically conductive material being operative to dissipate electrostatic charges present on a said article of electronic equipment when positioned adjacent said cushion member.

15. The support of claim 1, in which said cushion member is formed of an electrically conductive material operative to dissipate electrostatic charges present on a said article when inserted adjacent said cushion member.

16. The support of claim 1, in which said cushion member includes plural pressurized gas-filled cushion members arranged in a continuous strip form, at least one of said cushion members being connected by a hinge at each of its opposite ends to at least one other said cushion member;

whereby, said continuous strip of cushion members is convertible from a first condition in which said cushion members are arranged in face-to-face relation, to a condition in which said cushion members are arranged in a U-shaped configuration; a said article being receivable within said U-shaped configuration of cushion members with edge faces of said article presented to juxtaposed faces of said cushion members.

17. The support of claim 1, in which said cushion member is formed as axially elongate bolsters.

18. The support of claim 17, in which said axially elongate bolsters are comprised of interconnected longitudinally extending air chambers arranged in parallel side-by-side relation, whereby, compression of a central one of said air chambers will cause a distention of the adjacent air chambers.

19. The support of claim 1, including a second reinforcement provided by a sleeve of flexible material resistant to stretching of said flexible material, said sleeve surrounding said cushion member and providing a corset further limiting the extent of expansion of said cushion member.

* * * * *